United States Patent [19]

Franks

[11] Patent Number: 4,464,884
[45] Date of Patent: Aug. 14, 1984

[54] ADJUSTABLE BOTTLE CONVEYING APPARATUS

[75] Inventor: Nelson Franks, Toledo, Ohio

[73] Assignee: Owens-Illinois, Inc., Toledo, Ohio 43666, Ohio

[21] Appl. No.: 275,092

[22] Filed: Jun. 19, 1981

[51] Int. Cl.³ .............................................. B65B 53/06
[52] U.S. Cl. .................................... 53/557; 53/139.3; 198/415
[58] Field of Search .............. 53/557, 442, 329, 139.3, 53/314, 317, 419, 488; 198/415, 627, 411

[56] References Cited

U.S. PATENT DOCUMENTS

| | | | |
|---|---|---|---|
| 2,159,318 | 5/1939 | Carter | 198/415 X |
| 3,231,063 | 1/1966 | Talbot | 198/627 X |
| 3,595,369 | 7/1971 | Boulay et al. | 198/627 X |
| 3,722,657 | 3/1973 | Kienle et al. | 198/415 X |
| 4,248,030 | 2/1981 | Heckman | 53/442 X |

FOREIGN PATENT DOCUMENTS 956978  4/1964  United Kingdom ............... 53/139.3

Primary Examiner—James F. Coan
Attorney, Agent, or Firm—J. R. Nelson; M. E. Click

[57] ABSTRACT

A conveyor for transporting containers in a vertical position along a defined path through a power adjustable, container rotating mechanism. The rotating mechanism includes a pair of elongate friction members respectively disposed laterally adjacent the defined path of travel. One of the friction members is a movable wall device and the other friction member is a static wall device. Each friction member is laterally movable by cam devices controlled by power operated linkage mechanisms.

11 Claims, 9 Drawing Figures

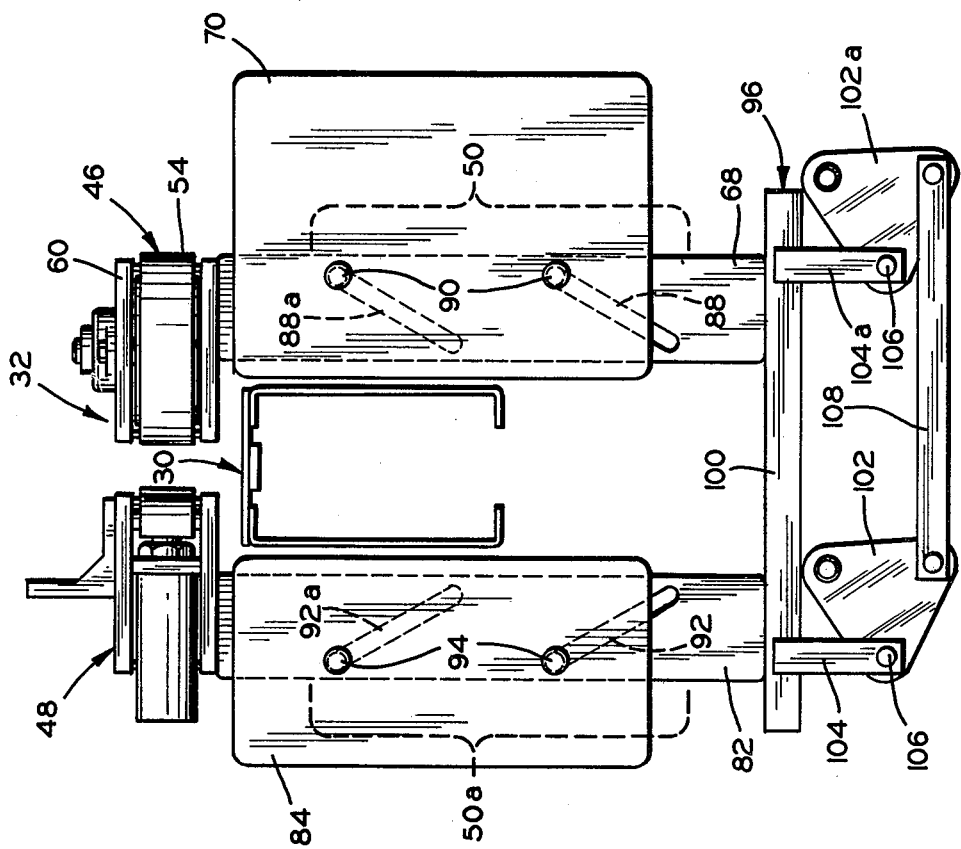
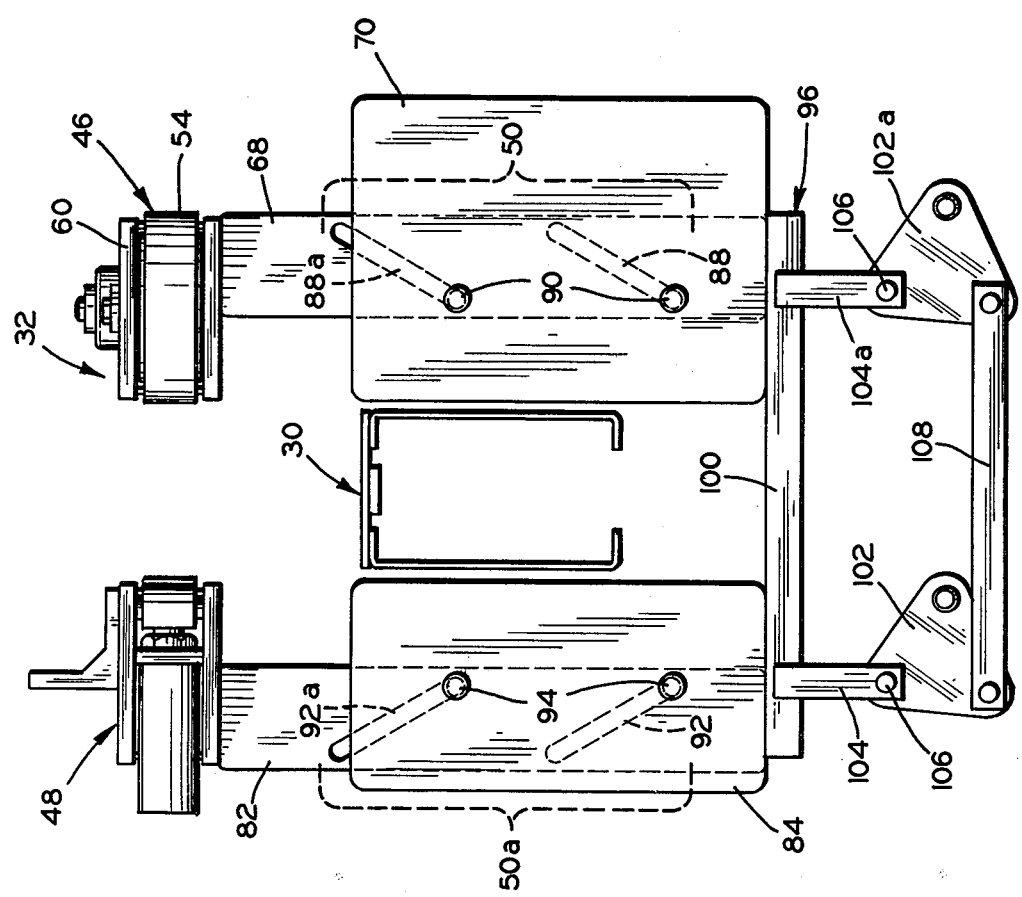

ADJUSTABLE BOTTLE CONVEYING APPARATUS

BACKGROUND OF THE INVENTION

1. Field of the Invention

This invention generally relates to a bottle conveying apparatus and more particularly to an improved conveyor apparatus for heat shrinking tamperproof bands onto necks of containers, which apparatus is conveniently adjustable to accommodate a variety of sizes of containers.

2. Description of the Prior Art

As is known, particularly in beverage bottling production lines, bottles or containers automatically pass continuously through a number of stations such as a filling station, a closure applying station, and a neck washing station at high speed. When tamperproof closures are employed, a heat shrinking station is conventionally inserted in the production line after the closure application station.

Various types of machines for conveying bottles at high rates of speed have been proposed in the past. One Example of such a machine is disclosed in British Specification No. 2,021,032A, issued to Obrist. In this machine, bottles standing upright on a moving conveyor belt are conveyed by a transport screw along a wall opposite the screw which rotates concurrently the bottles about their vertical axes. The conveyor belt and transport screw are operated in synchronism and the bottles are conveyed and rotated through a region where hot air is impinged on tamperproof bands to shrink them onto the necks of the bottles. A disadvantage of this machine is that the pitch of the transport screw will only accommodate bottles having one size diameter. Thus, when bottles having different size diameters are to be passed through the production line, the transport screw must be changed for each different size bottle to be run through the line. The downtime required in changing the transport screw each time a different size bottle is run is obviously expensive.

SUMMARY OF THE INVENTION

The bottle conveying apparatus constructed in accordance with the invention is designed to conveniently accommodate a range of different size containers. Generally the conveying apparatus comprises a horizontally disposed conveyor for transporting containers in an upright position along a defined path through a power adjustable rotating mechanism. The power adjustable rotating mechanism includes a pair of elongate friction members respectively disposed laterally adjacent the defined path of travel. One of the elongate friction members comprises a static wall device and the other elongate friction member comprises a friction wall device movable along the defined path of travel. Each friction member respectively is moved upwardly-outwardly and downwardly-inwardly relative to the defined path of travel by cam means which are selectively operated by a power operated linkage mechanism. The cam means and linkage mechanism cooperate with each other to permit the pair of friction members to automatically adjust to different size containers.

Further, the conveying apparatus may include a power actuated mechanism for quickly releasing the containers from the rotating mechanism. Also, the conveying apparatus may include a drying device for removing moisture from the necks of the container and a heating device for directing heated air onto the necks of the containers.

A specific object of this invention is to provide a conveyor for a heat shrinking apparatus for applying tamperproof bands to container necks having the capability of automatically accommodating a range of various size containers.

Other objects and advantages of the invention will become more apparent during the course of the following description when read in conjunction with the accompanying drawings wherein like numerals are employed to designate like parts throughout the same.

BRIEF DESCRIPTION OF THE DRAWINGS

FIG. 4 is an enlarged fragmentary end view, similar to FIG. 3 illustrating the bottle rotating means in a laterally expanded position;

FIG. 5 is a view similar to FIG. 4 illustrating the bottle rotating means in a laterally contracted position;

DESCRIPTION OF THE PREFERRED EMBODIMENT

Figure 1:
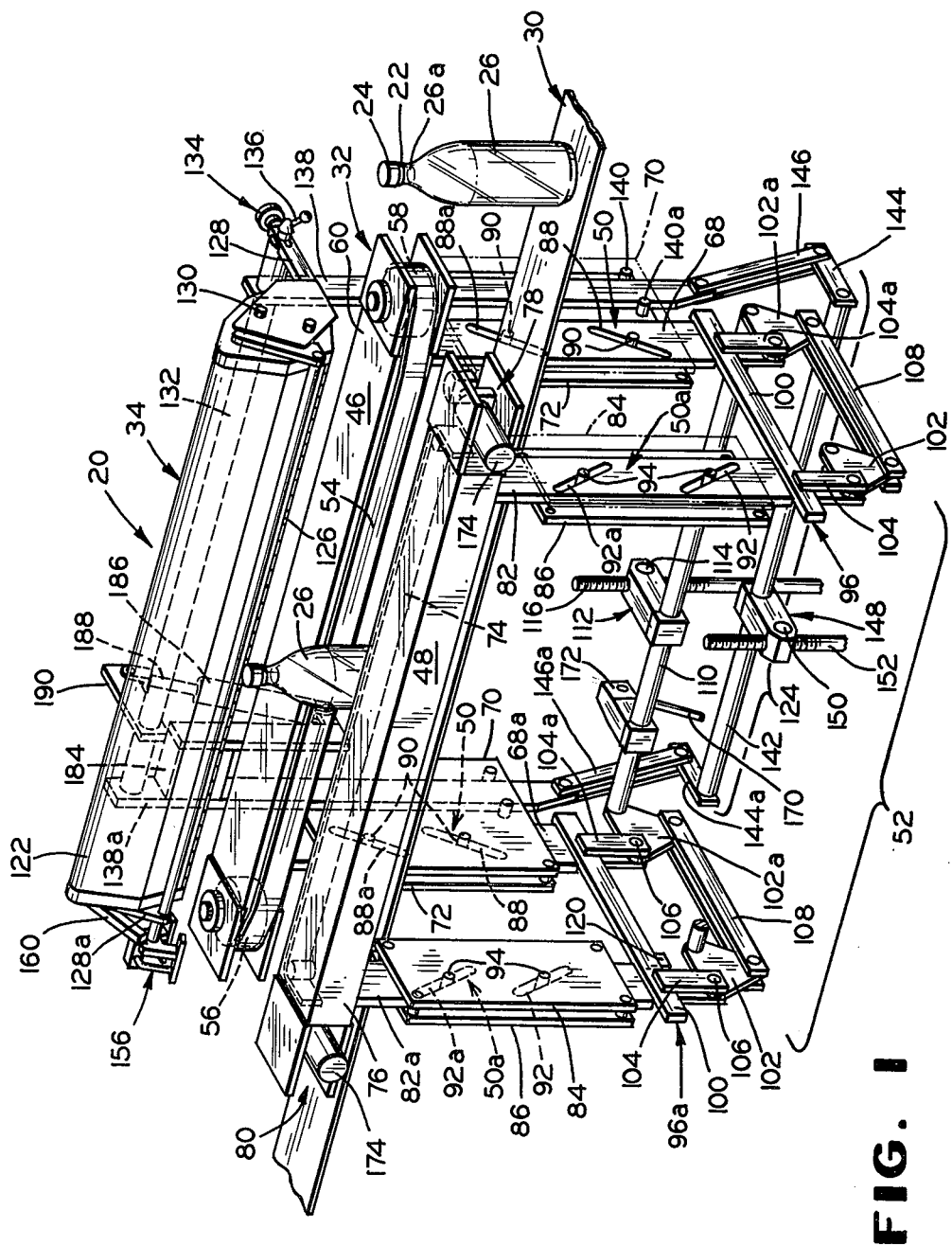
FIG. 1 is a partial perspective view, with parts broken away, of a bottle conveyor, employed in a heat shrinking apparatus.
Figure 2:
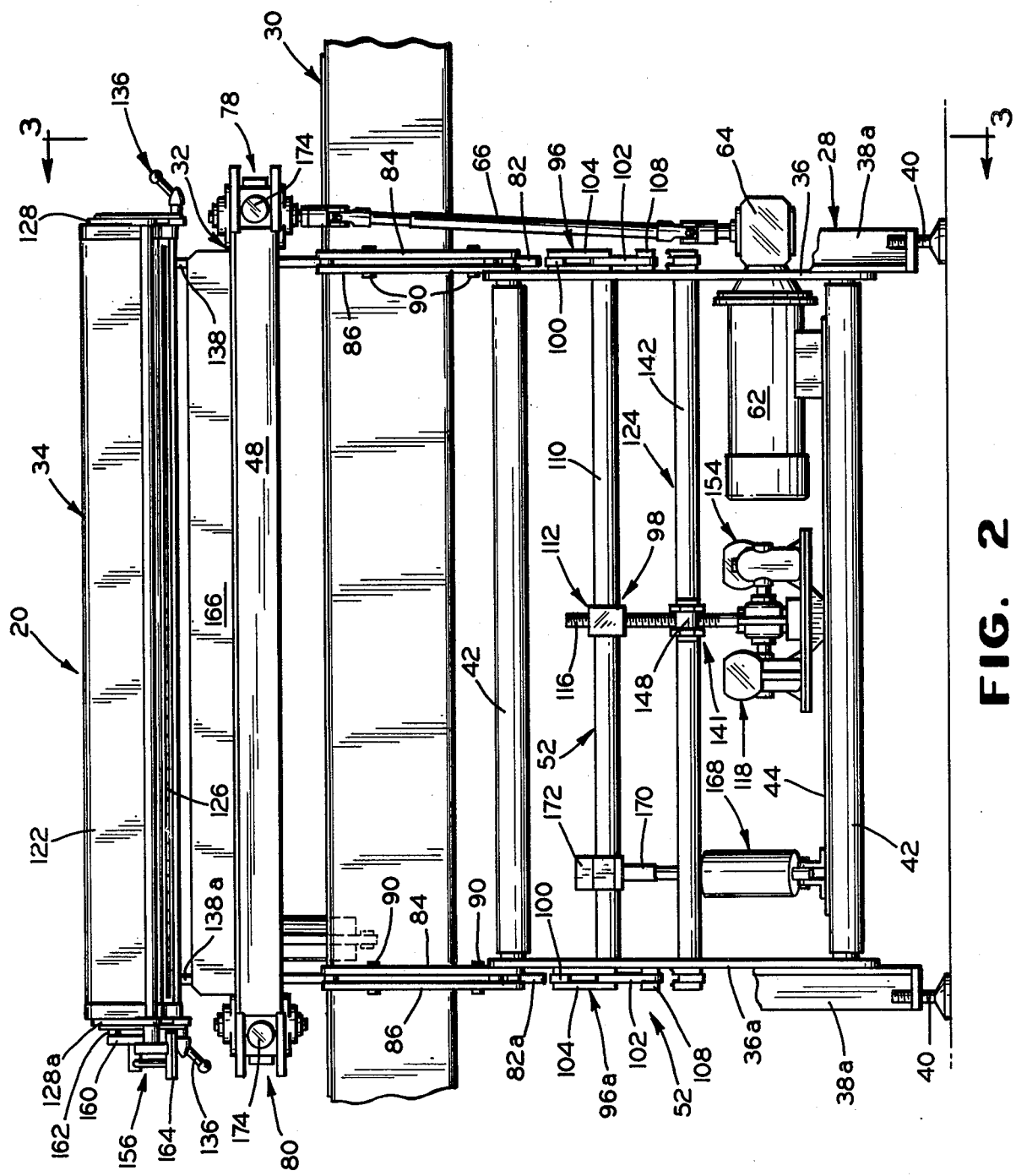
FIG. 2 is a front elevational view, with parts broken away for clarity of the apparatus illustrated in FIG. 1.
Figure 3:
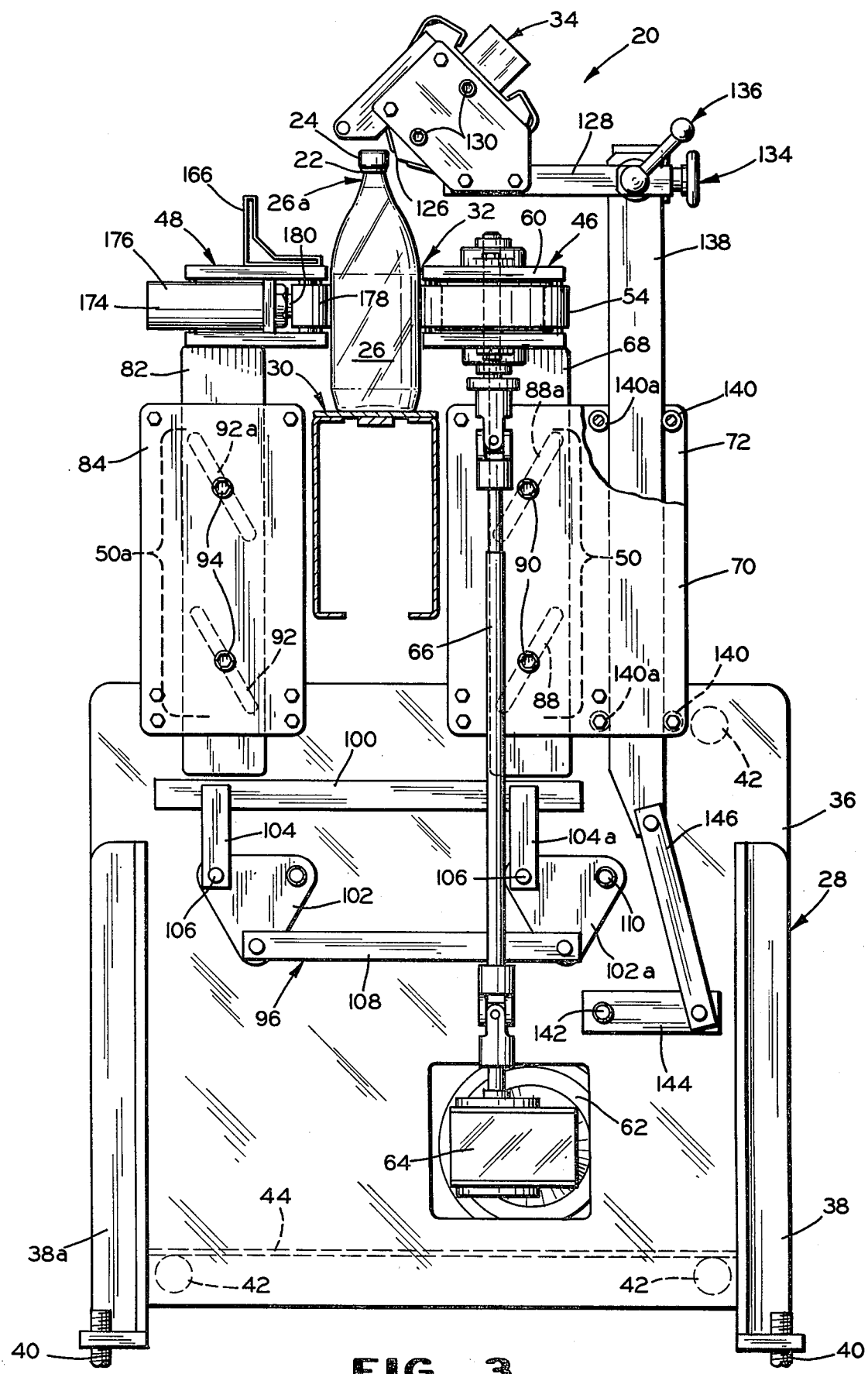
FIG. 3 is an enlarged end view, with parts broken away for clarity, looking in the direction of line 3—3 in FIG. 2.

Referring now to the drawings, particularly to FIGS. 1, 2, and 3, there is illustrated a heat shrinking apparatus designated in its entirety by the reference numeral 20 for shrinking plastic tamperproof bands 22 attached to closures 24 applied to a continuous line of vertically disposed containers 26 (only two shown in FIG. 1).

The apparatus 20 includes an elongate open base frame 28 adapted to be placed around conveyor 30 of a bottling production line, means 32 for rotating bottles 26 about their vertical axes, an elongate heating means 34 for directing heated air towards the tamperproof bands 22 for shrinking them onto the necks 26a of the containers 26.

Generally, the base frame 28, as illustrated in FIGS. 2 and 3, comprises a pair of upstanding longitudinally spaced side plates 36 and 36a each supported by a pair of angle shaped legs 38 and 38a at its opposite bottom extremities (see FIG. 3). A leveling foot 40 is attached to the bottom end of each leg 38 and 38a. The side plates 36 and 36a are connected together in longitudinally spaced relation by at least three triangularly arranged tie rods 42 (see FIG. 3). A floor plate 44 supported by the two lower tie rods 42 is provided for supporting various components of the operating mechanism of the apparatus as will be described hereinafter.

THE CONTAINER ROTATING MEANS

Referring particularly to FIG. 1, the container rotating means 32 is a friction device generally comprising an endless belt device 46 for frictionally engaging the side wall of each container 26 for rolling containers 26 along a static wall device 48. Devices 46 and 48 are laterally movable towards and away from the path of the bottle conveyor 30 by two sets of pairs of cam means 50 and 50a, thus permitting a wide range of bottle diameters to be accommodated. The spaced sets of cam means 50 and 50a are operated in synchronism by a crank and linkage mechanism 52 (see FIGS. 1 and 2).

More specifically, and as best illustrated in FIGS. 1 and 3, the device 46 constituting a moving friction wall, comprises an elongate endless belt 54 entrained around an idler pulley 56 and a driven pulley 58 (see FIG. 1) journalled for rotation at opposite ends of an elongate frame 60. As illustrated in FIGS. 2 and 3, the driven pulley 58 is rotatably driven by an electric motor 62 through a gear reduction box 64 and a slip propeller shaft 66. The frame 60 is supported by a pair of longitudinally spaced vertical plates 68 and 68a (see FIG. 1). Each plate 68 and 68a extends between a pair of vertically disposed support plates 70 and 72 attached to the top portion of each side plate 36 and 36a, see for example FIG. 2.

Still referring to FIG. 1, the static wall device 48 comprises an elongate strip 74 of friction material having each end secured to the adjacent end of an elongate frame 76 which is provided with open end portions 78 and 80, the purpose of which will be described hereinafter. The elongate strip 74 of friction material extends along the side of the frame 76 facing the endless friction belt 54. The frame 76 is supported by a pair of longitudinally spaced vertical plates 82 and 82a. Each plate 82 and 82a extends between a pair of vertically disposed support plates 84 and 86 (see FIG. 1) attached to the top portion of each side plate 36 and 36a, see for example FIG. 3.

Each depending plate 68 and 68a of the endless belt device 46 forms a portion of the cam means 50 which moves the device 46 upwardly-outwardly and downwardly-inwardly relative to the conveyor 30. More particularly, each plate 68 and 68a includes two vertically spaced, obliquely extending, parallel slots 88 and 88a which extend laterally of the conveyor 30 (see FIG. 1). A pin 90 secured to the plates 70 and 72 extends through each slot 88 and 88a and causes the support plates 68 and 68a to move laterally of the conveyor 38 as they are moved vertically. More particularly, as illustrated in FIG. 4, the slots 88 and 88a are oriented in such a manner so that upward vertical movement of the plates 68 and 68a will move the device 46 laterally outwardly, and as illustrated in FIG. 5, downward vertical movement of the plates 68 and 68a moves the device 46 laterally inwardly, relative to the conveyor 30.

Each depending plate 82 and 82a of the static friction device 48 forms a portion of the cam means 50a which moves the device 48 upwardly-outwardly and downwardly-inwardly relative to the conveyor 30. Each plate 82 and 82a includes two vertically spaced, obliquely extending parallel slots 92 and 92a which extend laterally of the conveyor 30. A pin 94 secured to the plates 84 and 86 extends through each slot 92 and 92a and causes the plates 82 and 82a to move laterally of the conveyor 30 as they are moved vertically. More specifically, the slots 92 and 92a are oriented in a manner so that upward vertical movement of the plates 82 and 82a causes the device 48 to move outwardly and downward vertical movement of the plates 82 and 82a causes the device 48 to move inwardly toward the conveyor 30 as illustrated in FIGS. 4 and 5, respectively.

CRANK AND LINKAGE MECHANISM

Referring particularly to FIGS. 1 and 3, the crank and linkage mechanism 52 for simultaneously moving the devices 46 and 48 laterally and vertically relative to each other and laterally of the conveyor 30 generally comprises a pair of longitudinally spaced linkage devices 96 and 96a each of which is adapted to move the plates 68-82 and 68a-82a vertically and a torque mechanism 98 (see FIG. 2) capable of moving the linkage devices 96 and 96a in synchronism.

Referring particularly to FIGS. 1 and 3, each linkage device 96 and 96a generally includes a laterally extending platform rail 100 movable in a vertical, oscillatable path and a pair of triangularly-shaped, laterally spaced crank brackets 102 and 102a for moving the platform rail 100 in its vertical path. More specifically, each end of the movable platform rail 100 is provided with a pair of spaced depending legs 104 and 104a whose free ends are pivotally connected as at 106 to corresponding apexes of the crank brackets 102 and 102a. A tie rod 108 pivotally connects a corresponding pair of crank bracket apexes together for unitary movement while the other two corresponding apexes may be pivotally mounted on the side plate 36 or 36a. As illustrated in FIGS. 4 and 5, the platform rail 100 supports the bottom ends of the depending plates 68-82 and 68a-82a except when containers 26 are disposed on the conveyor 30 between the devices 46 and 48 as illustrated in FIG. 3. In this case, the platform rail 100 will move away from the bottom ends of the depending plates 68-82 and 68a-82a and the weight of the devices 46 and 48 cause the facing walls thereof to bear against the sides of the containers 26 thus rotating the containers.

Figure 7:
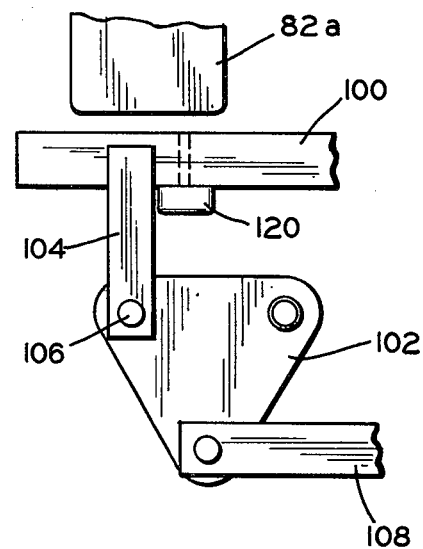
FIGS. 7, 8, and 9 are fragmentary views illustrating the various locations of limit switches employed in the operation of the apparatus.

Referring now to FIGS. 1 and 2, the torque mechanism 98 for moving the linkage devices 96 and 96a includes a torque rod 110 fixedly interconnecting the brackets 102a at their pivotal apexes to move the linkage devices 96 and 96a in unison. The ends of the torque rod 110 may be journalled in adjacent side plates 36 and 36a for providing a pivotal support mounting of the crank brackets. The torque rod 110 is rotated by a lever arm 112 extending from and clamped to the rod 110 as at 112a (see FIG. 8). The free end of the arm 112 is provided with a pivotally journalled nut 114 for travel along a substantially vertically disposed lead screw 116. The lead screw 116 is rotated by a drive motor and gear box 118 (see FIG. 2). In setting up the rotating mechanism 32 for receiving containers 26 therebetween, the torque rod 110 is rotated in a direction to move the platform rails 100 vertically upwardly. Accordingly, the endless belt device 46 and the static wall device 48 will move upwardly and outwardly away from the conveyor 30 (see FIG. 4) thus permitting a series of containers 26 to be placed therebetween on the conveyor 30. The torque rod 110 is then rotated in a direction to move the platform rail 100 vertically downwardly. Accordingly, the endless belt device 46 and that static wall device 48 will move downwardly and inwardly towards the conveyor 30 (see FIG. 5). The devices 46 and 48 will continue to move until they contact the side walls of the containers 26. The platform rails 100 will continue to move downwardly away from the ends of the plate 68-82 and 68a-82a until a limit switch 120 (see FIGS. 1 and 7) breaks a circuit (not shown) controlling the motor and gear box 118.

Figure 8:
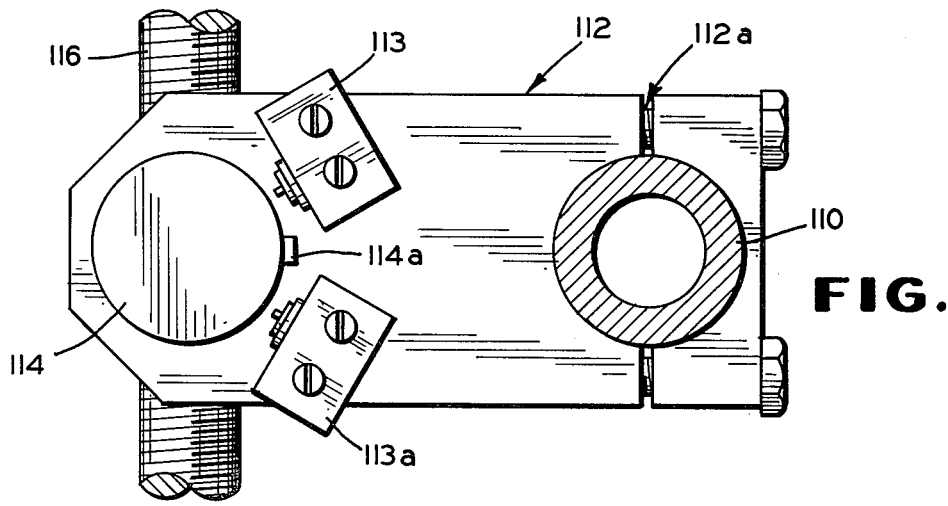

Referring now to FIG. 8, there is illustrated a pair of limit switches 113 and 113a, mounted on the lever 112 in spaced relation to pivotal nut 114, for providing limits for the upward and downward movement of the devices 46 and 48. More specifically, the pivotal nut 114 is provided with an abutment 114a which actuates either the limit switch 113 or 113a for breaking the electrical circuit (not shown) controlling the motor and gear box 118.

THE HEATING MEANS

Referring now to FIGS. 1 through 3, the heating means 34 generally comprises a vertically, movable elongate heating device 122 disposed along the path of the conveyor 30 and an elevator mechanism 124.

More particularly, the heating device 122 is of the hot air type and includes a slot-like nozzle 126 extending the length of the device 122. Pressurized air is supplied to the housing of the device 122 from a source (not shown) and passes through a heater (not shown) to the nozzle 126 for producing a jet of heated air along the length of the device 122. The nozzle is positioned so that it directs a jet of heated air in the plane of movement of the tamperproof bands 22 applied to the neck of containers 26 and obliquely angled toward the vertical axis of the containers 26 so as to impinge on the tamperproof bands.

The heating device 122 is mounted between like, spaced brackets 128 and 128a in any suitable manner such as at 130. The brackets 128 and 128a are connected to and project from a mounting bar 132 (see FIG. 1) to extend towards the path of the conveyor 30. Each bracket 128 and 128a is provided with a conventional style lateral adjusting mechanism 134 and locking device 136.

The mounting bar 132 is pivotally mounted in the upper ends of a pair of longitudinally spaced vertically movable columns 138 and 138a. Each column 138 and 138a is mounted between portions of the plates 70 and 72 and between pairs of guide rollers 140 and 140a (see FIG. 3).

The columns 138 and 138a are moved in unison by a torque mechanism 141 which includes a torque rod 142, the ends of which are provided with a crank arm 144 or 144a. Each crank arm 144 and 144a is connected to the lower end of the adjacent column 138 and 138a by a link member 146 and 146a, respectively. The ends of the torque rod 142 may be journalled in the adjacent side plate 36 or 36a. A lever arm 148 extends from and is clamped to the torque rod 142. The free end of the lever 148 is provided with a pivotally journalled nut 150 which travels along a substantially vertically disposed lead screw 152. The lead screw 152 is rotatably driven by a drive motor and gear box 154 (See FIG. 2).

Figure 9:
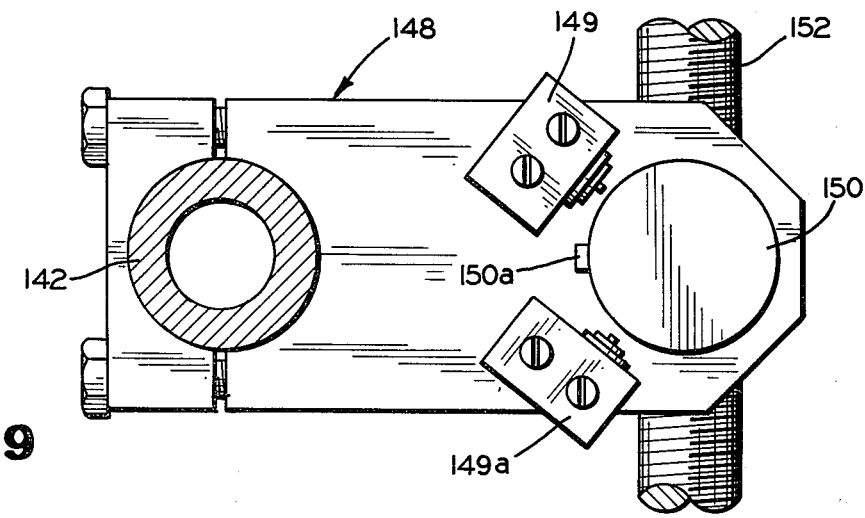

Referring now to FIG. 9, there is illustrated a pair of limit switches 149 and 149a, mounted on the lever 148 in spaced relation relative to the pivotal nut 150 for providing limits for the upward and downward movement of the heater 34. More specifically, the pivotal nut 150 is provided with an abutment 150a which actuates either the limit switch 149 or 149a for breaking an electrical circuit (not shown) controlling the operation of the motor 154.

OPERATION

Containers 26 having tamperproof closures 24 thereon, are serially introduced into the apparatus 20 by the conveyor 30 from a previous neck washing operation (not shown). Accordingly, the necks 26a of the containers 26 having the closures 24 thereon are passed through a device 156 (see particularly FIG. 6) for removing moisture from the tamperproof bands 22 and the adjacent neck surfaces 26a of the containers 26.

Figure 6:
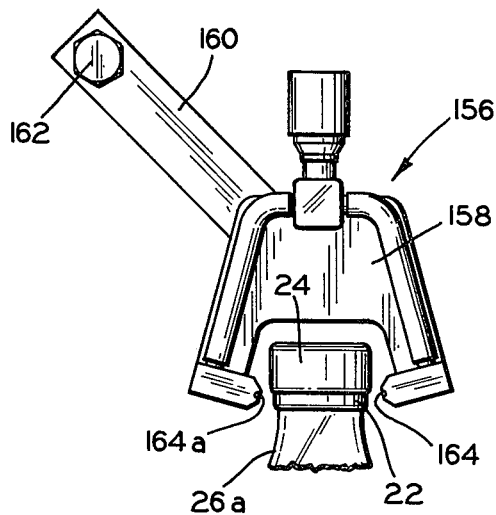
FIG. 6 is an end view of an air device for removing moisture from the tamperproof bands and the necks of the containers.

As illustrated in FIGS. 2 and 6, the device 156 which may be an air device, includes a bifurcated member 158 attached to the bracket 128a by an arm 160 in a suitable manner for examples as at 162. The members 158 includes a pair of facing end nozzles 164 and 164a for directing jets of air towards the tamperproof bands 22 thus removing moisture therefrom.

The containers 26 are advanced by the conveyor 30 between the container rotating elements 46 and 48 which roll the containers 26 about their vertical axes so that the tamperproof bands 22 are completely exposed to the hot air nozzle 126 as they are passed therealong.

As best illustrated in FIG. 3, the heater nozzle 126 is obliquely positioned at an angle to the plane of travel of the tamperproof bands 22 so as to impinge a stream of heated air on the tamperproof bands 22. As the containers 26 are pressed between the endless belt device 46 and the static wall device 48, the containers 26 will rotate about their vertical axes. In other words, the moving endless belt causes the containers to roll along this static wall 48. During the entire movement of the containers 26 through the rotating mechanism 32, a jet of hot air from the nozzle 126 impinges on the tamperproof bands 22 thus shrinking them onto the necks 26a of the containers.

An elongate shield 166 (see FIGS. 2 and 3) angle-shaped in cross section, is mounted on the static wall device 48 for preventing direct impingement of heated air onto an operator.

The spacing between the moving friction wall device 46 and the static friction wall device 48 of the rotating mechanism 32 is determined by the diameter of the containers 26 being processed in the bottling production line. Accordingly, the spacing for each particularly size container is set by first actuating the motor 118 to rotate the torque rod 110 in a direction moving the linkage mechanism 52 upwardly. Accordingly, the devices 46 and 48 will also move upwardly-outwardly, permitting a number of desired size containers to be placed therebetween on the conveyor 30. The motor 118 is then reversed rotating the torque rod 110 in a direction moving the linkage 52 downwardly thus permitting the devices 46 and 48 to move downwardly-inwardly until they contact the side walls of the containers 26. As previously described, the linkage 52 will continue to move away from the devices 46 and 48 until the limit switch 120 de-energizes the motor 118. Accordingly, the weight of the devices 46 and 48 will be borne by the containers 26 causing the containers to roll about their vertical axis.

In the event that the containers 26 jam within the rotating mechanism 32, quick acting second power means operating the crank and linkage mechanism 52 is provided for releasing the containers 26 from the rotating mechanism 32. More specifically, as best illustrated in FIGS. 1 and 2, a cylinder 168 pivotally mounted on the floor 44 has its piston rod 170 pivotally connected to the end of a lever 172 projecting from and clamped to the torque rod 110. By actuating the cylinder 168, the moving endless belt device 46 and the static device 48 may be quickly moved upwardly and outwardly away from the containers 26. A gate 174 is provided in each open end portion 78 and 80 of the static device 48 and are concurrently energized for preventing containers 26 from entering or exiting the rotating means 32. Referring now to FIG. 3, each gate may comprise a cylinder 176 having an abutment means 178 mounted on the end of its piston rod 180. The cylinder 176 is mounted in a position so that the abutment 178 may be laterally extended and retracted over the conveyor 30.

Further, the heating means 34 is provided with means 182 (see FIG. 1) for pivotally moving it away from the containers 26, when this apparatus 20 is not in use or malfunctions. More specifically, as illustrated in FIG. 1, the column 138a is provided with a mounting bracket 184 on which a cylinder 186 is pivotally mounted. Its piston rod 188 is pivotally connected to a lever 190 clamped on the mounting bar 132 which is pivotally supported by columns 138 and 138a. Actuation of the cylinder 186 (which may be automatically actuated), pivotally moves the heating means 34 away from the containers 26. Manual control means, such as push button switches (not shown) are provided for individually controlling the various components of the apparatus.

It is to be understood that the form of the invention herewith shown and described is to be taken as a preferred embodiment of the same and that various changes in the space, size, and arrangement of the parts may be resorted to without departing from the spirit of the invention.

I claim:

1. An apparatus for successively moving and rolling containers, comprising:
   a. means for serially conveying containers in a vertical position along a defined path;
   b. frictional means for engaging opposed portions of the vertical side walls of the containers for controlling the containers about their vertical axes as they are conveyed along the defined path of travel, said frictional means comprising a pair of elongate members respectively disposed laterally adjacent to the defined path of travel, each member of said pair of members including cam means for moving each member upwardly-outwardly and downwardly-inwardly relative to the defined path of travel; and
   d. power driven means for moving said frictional engaging means towards and away from the defined path of travel for automatically accommodating containers of various sizes.

2. The invention defined in claim 1 including a second power actuated means for quickly moving said friction means upwardly and outwardly away from the defined path of travel and means for concurrently closing a gate across the input end of said conveyor path.

3. The invention defined in claim 1 wherein one member of said pair of members comprises a laterally movable static friction wall and the other member of said pair of elongate members comprises a laterally movable frictional wall moving along the defined path.

4. The invention defined in claim 3 wherein said moving friction wall member comprises a power driven endless belt.

5. The invention defined in claim 1 wherein said cam means comprises a plurality of pairs of spaced, obliquely extending slots lying in a plane extending laterally to the defined path of travel of said conveying means.

6. The invention defined in claim 1 wherein said cam means comprises at least one vertically movably disposed plate attached to each said elongate member and at least one stationary vertically disposed plate, and one of said plates includes a cam slot and the other said plate includes a cam pin.

7. The invention in claim 1 or claim 5 wherein said frictional moving means comprises:
   a. a power driven bell crank; and
   b. means disposed between said bell crank and said cam means for moving said cam means.

8. An apparatus for heat shrinking tamperproof bands onto the necks of containers and successively moving and rolling the containers about their vertical axis, comprising:
   a. means for serially conveying containers in a vertical position along a defined path;
   b. frictional means for engaging opposed portions of vertical side walls of the containers for rolling the containers about their vertical axes as they are conveyed along the defined path of travel;
   c. power driven means for moving said frictional engaging means towards and away from the defined path of travel for automatically accommodating containers of various sizes;
   d. heating means directed towards the tamperproof bands and disposed along the defined path of travel whereby the tamperproof bands are uniformly heated and shrunk onto the necks of the containers; and
   e. power means for pivotally moving said heating means away from the path of travel of said conveying means.

9. The invention defined in claim 8 comprising first and second power means each connected to said power driven means and independently operable, said first power means being operable to move the frictional engaging means for automatically accommodating containers of various sizes, and said second power means being operable for quickly moving said frictional means away from the defined path of the containers.

10. The invention of claim 9, including means for concurrently closing a gate across the input of the defined path of said container conveying means upon the operation of the second power means.

11. The invention of claim 8 including a separate means for removing moisture from the tamperproof bands of the containers disposed ahead of the heating means along said defined path, said separate means comprising air nozzle means for directing air jets toward the tamperproof bands of the containers.

* * * * *